United States Patent Office 3,535,520
Patented Oct. 20, 1970

3,535,520
METHOD OF AND APPARATUS FOR THE MEASUREMENT OF PHYSICAL CHARACTERISTICS OF X-RAYS, IN PARTICULAR OF γ-RAYS, AND ITS APPLICATION
Michael J. Higatsberger, Peter Weinzierl, and Harald P. Hick, Vienna, Austria, assignors to Osterreichische Studiengesellschaft fur Atomenergie Ges. m.b.H., Vienna, Austria, a corporation of Austria
Filed Nov. 9, 1964, Ser. No. 409,643
Claims priority, application Austria, Nov. 13, 1963,
A 9,107/63
Int. Cl. G01e 1/24
U.S. Cl. 250—83.3
10 Claims

ABSTRACT OF THE DISCLOSURE

A method and apparatus of measuring the physical characteristics of X-rays, particular of gamma rays, preferably for measurements of nuclear reactor core fuel, comprising feeding primary X-ray radiation to a semiconductor detector in which the X-ray radiation undergoes a scattering interaction producing secondary radiation, the latter of which is detected and producing a first signal proportional to the energy of the secondary radiation, and sending the first signal to a coincidence circuit. The scattered primary X-ray radiation is detected in at least one selectively positioned second detector which produces a second signal as a result thereof. The second signal is sent to the coincidence circuit which is adapted to permit the first signal to pass to a measuring device when the first and second signals are substantially simultaneously received by the coincidence circuit, and measuring and classifying the first signals in the measuring device and counting predetermined first signals thereby providing a measure of the intensity of predetermined X-rays of the primary X-rays.

The present invention relates to a method of and apparatus for the measurement of the physical characteristics of X-rays, and in particular of γ-rays and its application, and pertains in the first place to a method of measuring the physical characteristics of X-rays, and in particular γ-rays and of their energies.

During the operation of a nuclear reactor, various fission products are created by the fissioning of uranium, which fission products are radioactive and emit γ-rays. The half-life of the various fission products vary over wide ranges. Among such fission products created in a nuclear reactor, there is, for instance, a fission product having a half-life of 30 years. Accordingly during the various operating and shut-down periods of the reactor, only negligibly small portions of this long half-life fission product disintegrates, and after a total operating period of the reactor of, for instance, two years, the total amount of this fission product is essentially the total amount created. If, thus, the quantity of this fission product is measured by a determination of the intensity of the γ-rays, which it emits the total power produced by the uranium fuel material can be calculated.

If a short half-life fission product is chosen for the investigation, for instance, a fission product having half-life of one month, the concentration of such fission product reaches an equilibrium or saturation condition during the reactor operation, namely, the same quantity of fission products of this type is formed as the quantity which decays, during operation of the reactor. If the intensity of the rays of this fission product is measured upon shut-down of the reactor, then due to the rapid decay without further production of this product, the quantity remaining may be calculated, which quantity is a measure of the length of time since the reactor was shut-down.

In an analogous manner, further deductions about the performance of the reactor operation can be made by measuring fission products with other half-lives.

If γ-rays impinge upon a crystal, which serves as a radiation detector, an energy transfer from a γ-ray to an electron in this crystal takes place. This can be brought about such that the total energy of the γ-radiation or only a part of the energy is transmitted to the electrons. The latter procedure is called scattering, whereby the impinging γ-particles continue their movement in a changed or scattered direction and with reduced energy, the remainder of the energy being transmitted to the impinged electron. The energy transmitted to the electron is then measured in the radiation detector which is transformed into an electric pulse. Due to the different interactions of the γ-radiation with the electrons in the crystal, a substantially continuous distribution of energy losses of the γ-particles occur and, thereby, of a spectrum or plurality electric pulse values are created at the output of the radiation detector for primary γ-radiation of uniform energy, which impinges upon the detector. This leads to an extremely complicated picture of the distribution of the pulse values of this radiation detector, since a spectrum comprises many γ-energies. The method used in the present invention applies the expedient that from the different γ-particles only those are selected by the detector, which lead to a radiation scattering of nearly 180°. This is performed by a second radiation detector which is brought into this particular local position. If a radiated γ-particle scatters back to the second detector, then this occurrence is characterized by the fact that the two pulses in the first and in the second detectors occur substantially simultaneously. The flying time can be neglected, thereby. The electronic circuit is arranged such, that among all pulses created in the first detector, only those are chosen and used for the further measuring, which comply with the condition of simultaneity with the radiation pulses received by the second detector. In this manner γ-radiation of uniform energy, which impinges upon the device is characterized by a single line only in the distribution of the pulse values, which are to be investigated. The pulse value corresponding to this line stands in a clear and calculable connection with the energy of the incoming primary γ-radiation. If primray γ-rays of different energy impinge upon the device, a distribution of the pulse values is created, which is composed of the same number of lines as the number of different impinging particles. This distribution of pulse values is quantitively measured and, accordingly there is determined the position of this line and the energy of the γ-radiation. This is achieved by pulse value analyzers. A simple pulse value analyzer comprises, for instance, the following arrangement:

An electronic unit having two states of equilibrium is used. If an electric pulse, which surpasses a predetermined value, for instance, 10, v., impinges upon such device, then this unit changes from one equilibrium state into another equilibrium state. This process is characterized by an output electric pulse which can be registered. If a second analogous device is used, the responsive gate of which is, for example, 12 v., neither unit will respond to pulses which are smaller than 10 v. only the first unit and not the second unit will respond to all pulses between 10 and 12 v.; and both units will respond to all pulses above 12 v. Another electronic circuit is used, which passes a pulse only if the unit with the lower minimum voltage responds and the unit with the higher minimum voltage does not respond (that means only pulses between 10 and 12 v. give an output pulse which is registered). By using a great number of such circuits, with differently high responsive gates, the total distribution of the pulse values can be analyzed and registered.

It is one object of the present invention to provide a method of measuring physical characteristics of X-rays, in particular γ-rays wherein the rays are fed to a semi-conductor-detector, and wherein the scattered radiation is fed to one or a plurality of receiving devices and a comparision of the pulses in the semi-conductor-detector and in the receiving devices is made.

It is another object of the present invention to provide an apparatus for the measuring of physical characteristics of X-rays, in particular γ-rays, wherein the apparatus comprises a collimator for the selection of a bundle of rays, a semi-conductor-detector for the receiving the radiation, and one or a plurality of devices receiving the scattered radiation from the semi-conductor-detector, whereby the receiving devices and the semi-conductor-detector are connected with a measuring device through a coincidence circuit. The preferred field of application of the method and of the apparatus of the present invention is within the area of measuring fuel elements in nuclear reactors. It is possible, thereby, in this advantageous manner, to perform destruction-free measuring of fuel elements. The measuring extends, thereby, to different burn-up conditions of the fuel elements, as well as to different burn-up processes. Thus, it is possible not only to draw conclusions about the present transient burn-up state at the time of the measuring of the fuel element, but deductions about the cumulative burn-up process can also be drawn.

In nuclear devices, which are used for the production of energy, it is desirable for economical reasons, to know exactly the burn-up state of fuel elements at different time-phases. Such knowledge permits an optimum program for fuel elements in the reactor core and, thereby an achievement of higher exploitation of energy. Furthermore, it is desirable in connection with control measures, to have available for control accurate indications of the reactor operation, which is independent of the measuring technique. In accordance with the present invention, the following effects are utilized:

In fission processes with nuclear fuels more than one hundred different radioactive isotopes are created, which have long or short half-lives and characteristic γ-energies. By means of the described method, a predetermined number of favorable fission products can be applied for the evaluation of the burn-up state and of the burn-up history. It is merely required therefor to obtain by means of γ-spectroscopic methods the γ-energies of the fission products to be considered. If this is achieved, a comparison of the relative intensities of the measured γ-lines, obtained by the present invention, suffices, since from fissioning and shut-down of the reactor, the intensity of the individual γ-lines relative to each other can be predicted in advance. A knowledge of the intensity of the different fission products indicates the reactor condition. This complicated procedure will find its application primarily for control purposes. On the other hand, the measuring of the individual fission product line, as for instance, that of long-lived cesium 137, permits the determination of the total number of neutrons and, thereby, the burn-up of the fuel element. This information alone is of great technical and economical importance for the programming of the fuel. Until now similar information could be obtained only by the destruction of the fuel element and radiochemical analysis, a method which, due to the extremely high activities, which occur therein, is extremely cumbersome, expensive, and inexact. In principle, the concept of the present invention is applicable to solid, liquid and also gaseous substances.

The method according to the present invention is based substantially on the Compton-effect and on the pair-formation effect occurring with X-rays.

With these and other objects in view, which will become apparent in the following detailed description, the present invention will be clearly understood in connection with the accompanying drawings, in which.

Figure 1:
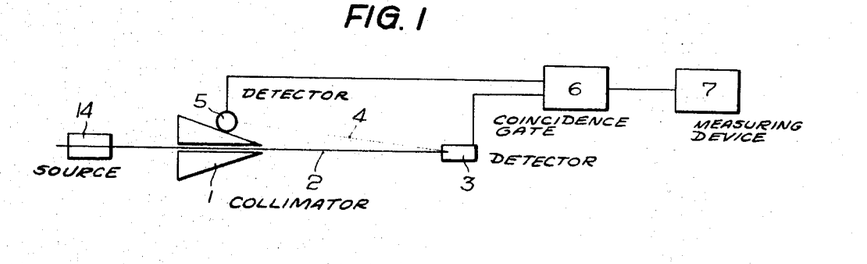
FIGS. 1 and 2 show schematically the arrangement of the device designed in accordance with the present invention for different physical measurings.
Figure 2:
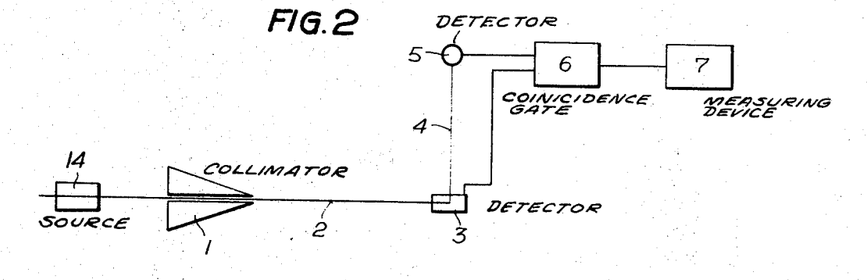

Referring now to the drawings, and in particular to FIGS. 1 and 2, the radiation originates from a source 14, which radiation passes initially through a collimator 1 for the selection of a radiation bundle 2.

The collimated primary radiation 2 impinges then upon a semi-conductor-detector 3. Due to the radiation impinging upon the semi-conductor-detector 3, one part of the energy is transmitted to an electron, consituting secondary radiation, in accordance with the Compton effect, while the other part of the energy is scattered in form of radiation rays 4. This scattered radiation 4 then reaches a receiving device 5 in form of a crystal, preferably a NaJ-crystal. As it is apparent from FIG. 1, the direction of return of the reflected radiation 4 is about 180° relative to the incoming radiation 2, and at this angle the amount of reflected energy remains nearly constant. The pulses created in the detectors 3 and 5 by the collided and scattered radiation particles, respectively, are sent to a coincidence circuit 6, and the output thereof is sent to a measuring device 7.

FIG. 2 shows another device in accordance with the present invention practically the same as that of FIG. 1, but, however, the angle between the scattered or reflected radiation 4 and the incoming radiation 2 is about 90°. This circuit finds its application for measuring linear polarization. In this case, the counting rates are measured in dependency upon the rotation about the axis of the incoming radiation (for instance γ-radiation).

Figure 3:
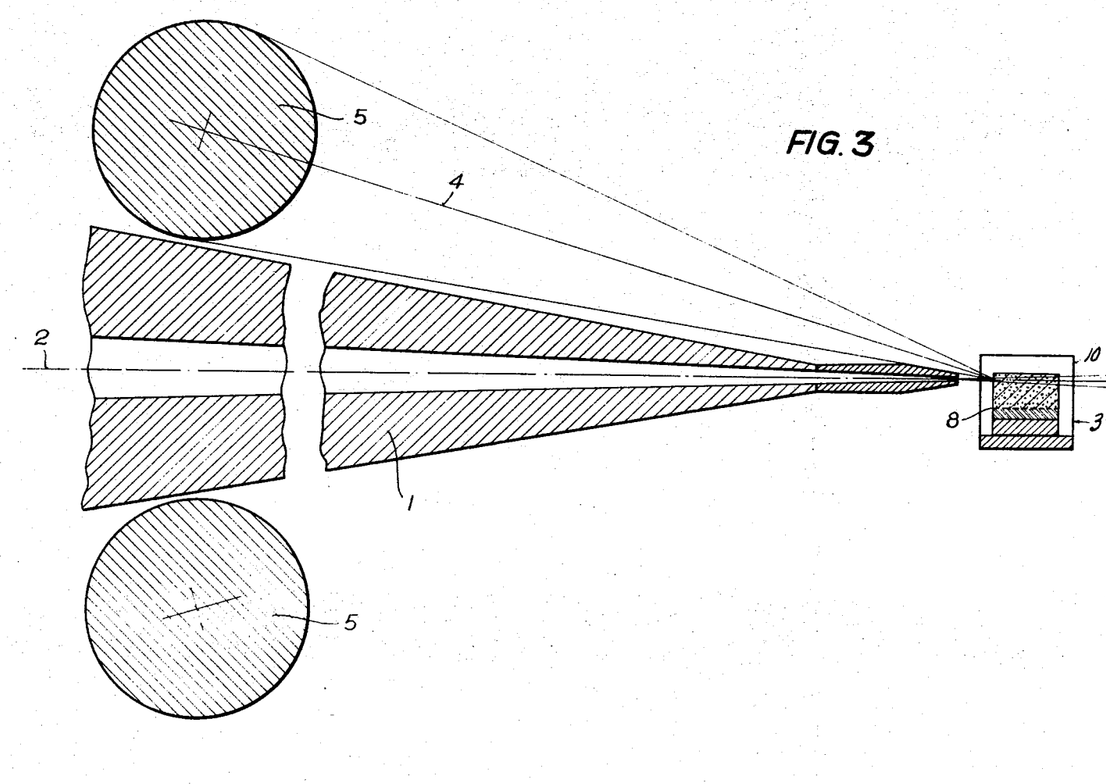
FIG. 3 is an arrangement for the measuring of the energy composition of the radiation.

In all these cases, a high energy release is obtained by the use of the semi-conductor-detector. FIG. 3 shows in at an enlarged scale the essential measuring part of FIG. 1. It is furthermore shown that a plurality of receiving devices 5 are provided. Furthermore, it is apparent that the radiation 2 is introduced close to the positive electrode of the semi-conductor-detector 3.

Figure 4:
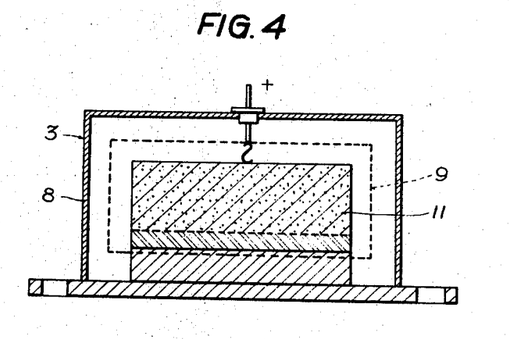
FIGS. 4 and 5 are sections of a semi-conductor-detector.
Figure 5:
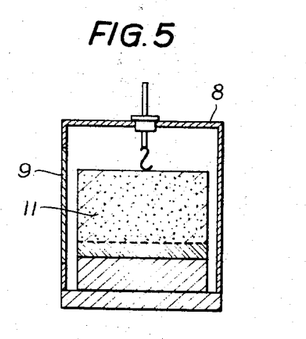

FIGS. 4 and 5 disclose in an enlarged scale the semi-conductor-detector 3. The detector 3 is disposed in a bronze housing 8, which is equipped with an aluminum window 9, to permit penetration of the radiation. The housing 8 is filled with an inert gas, instance, dried nitrogen. The semi-conductor-detector 3 is cooled, preferably by means of a copper socket, which is immersed in liquid air. A cooling by equivalent means for instance, by the use of the Peltier-effect is likewise possible. The cooling maintains the perturbation level of this detector to a minimum. Concerning different constructions of such semi-conductor-detectors 3, reference is made again to FIG. 3 of the drawings. The housing 10 consists there of Plexi-glas which has a Mylar window. Dry air circulates in the housing between the Plexiglas housing and the inner housing 8 made of bronze. In this manner, any condensation of humidity is prevented.

Figure 6:
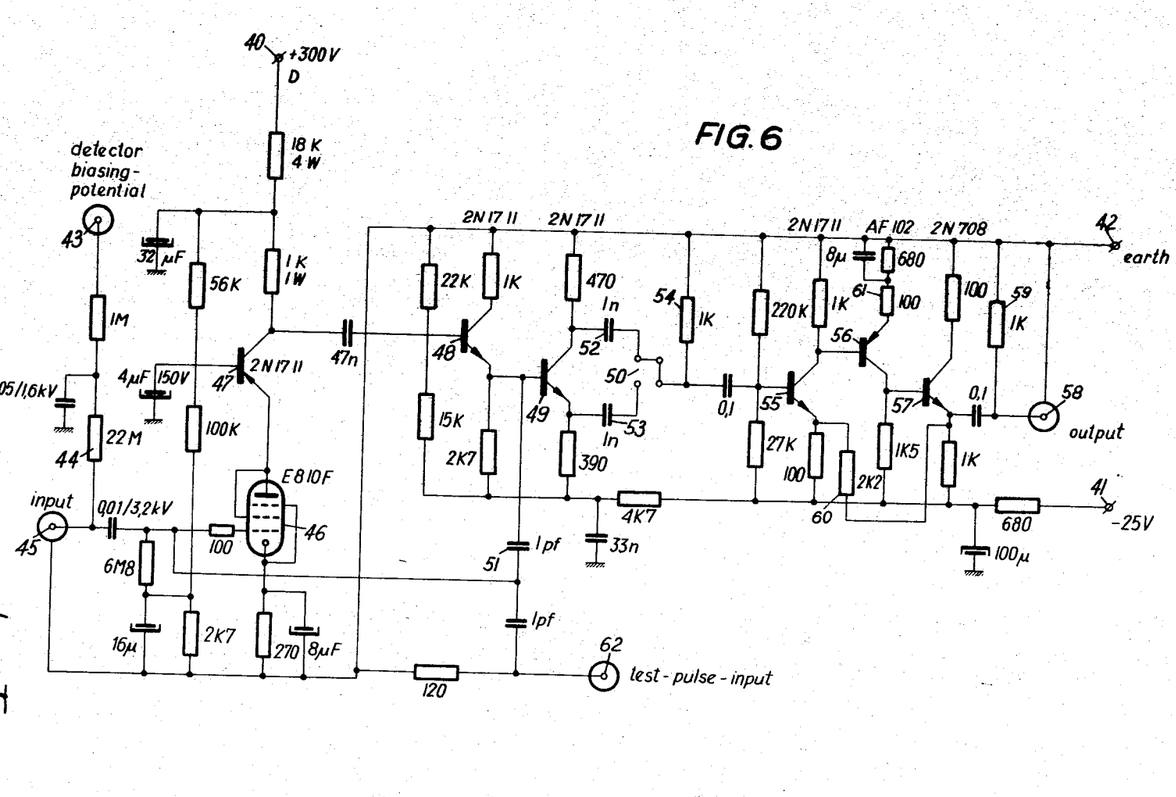
FIG. 6 is a circuit diagram used in connection with the device.

FIG. 6 discloses a circuit diagram and indicates merely by example an amplifier, which can be connected directly with the semi-conductor. The essential characteristic of this amplifier resides in its low shading.

The amplifier needs +300 v. (connection 40), —25 v. (connection 41) and a ground connection 42. Detector bias is supplied at 43 through detector load resistor 44. The detector is connected at the input 45. The tube 46 and the transistor 47 form a cascade input stage. Transistors 48, 49 form an inverting stage. The polarity switch 50 allows positive output pulses with all types of detectors (positive or negative input pulses). The small capacitor 51 makes the input configuration charge sensitive by capacitive, negative feedback. 52, 53 and 54 is the differentiating network. 55, 56, 57 are further transistor amplifiers and output driver. 58 is the output with 1 kΩ impedance 59. 60 is a negative feedback as well as 61. At 62 a mercury pulser may be connected for test.

Figure 7:
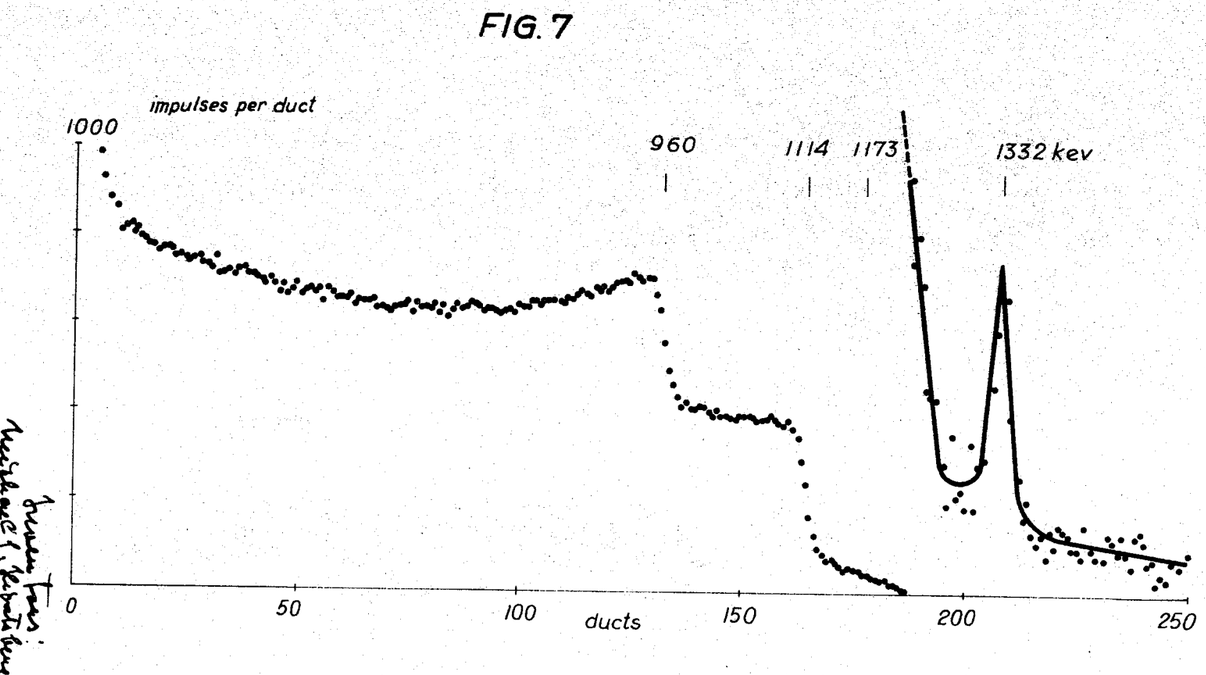
FIGS. 7 and 8 depict diagrams which denote the manner of operation of the present invention.
Figure 8:
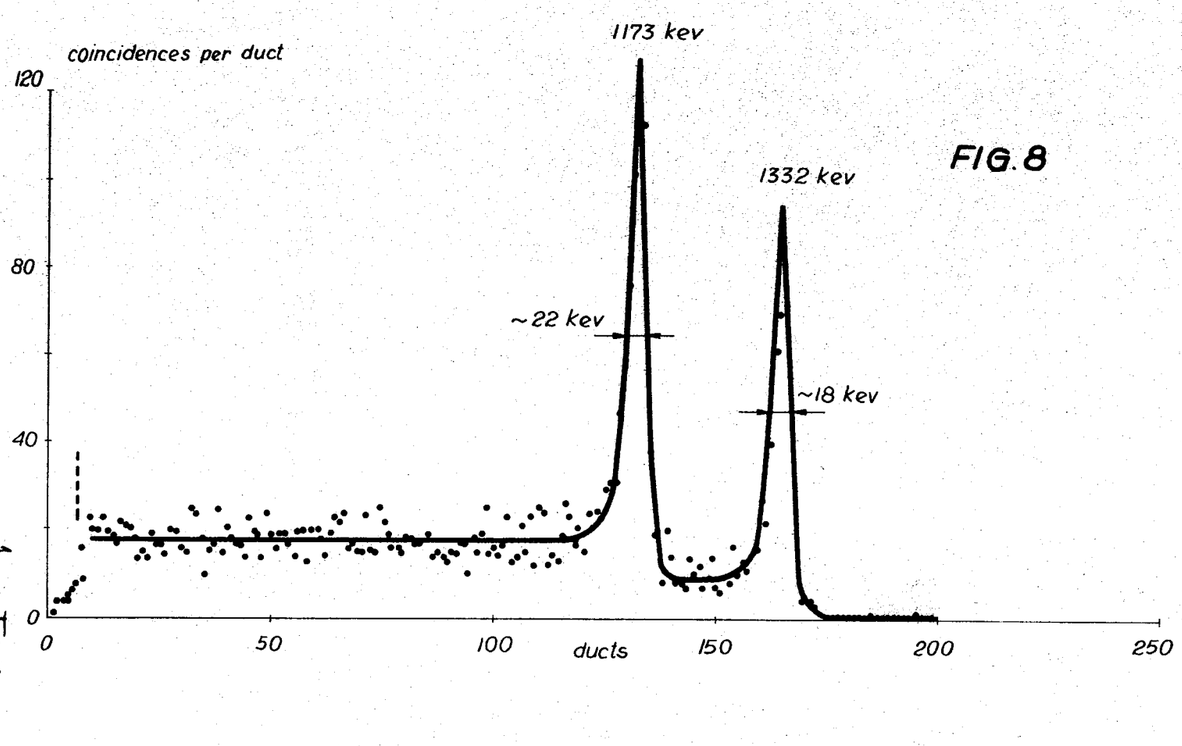

FIGS. 7 and 8 show diagrams in connection with particular embodiments of the subject matter of the present invention. FIG. 7 discloses a cobalt-60 spectrum as it is obtained directly from a semi-conductor. It is apparent that the photopeaks are hidden in a comparatively high background. In contrary thereto, FIG. 8 permits the recognition of an image, in which a coincidence circuit in accordance with the present inventon is applied. In accordance with the present invention, the photopeaks are clearly depicted above the background.

Figure 9:
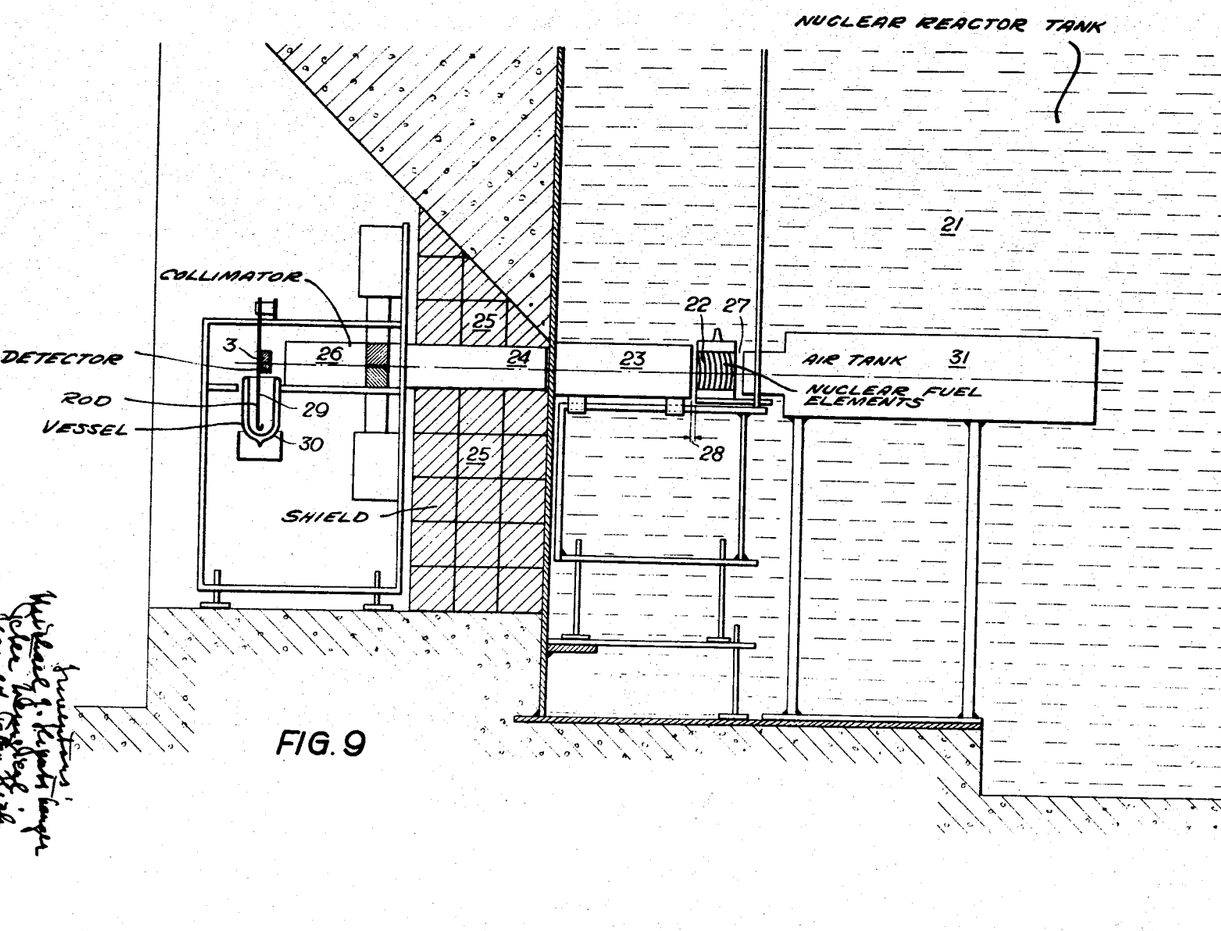
FIG. 9 discloses a particular embodiment of the present invention, partly in section.

FIG. 9 demonstrates a device in which the method according to the present invention for the measuring of fuel elements in core reactors finds application. The measuring device (shown in FIG. 9 on the left side) is disposed outside of a reactor tank 21. The measuring device is disposed movably. Fuel elements 22 are disposed inside the tank. Adjacent to the fuel element 22 a first collimator part 23 is provided, followed outside of the tank by a second collimator tank 24, which is disposed in the reactor shield 25 in front of the tank 21. Finally, a third collimator 26 is provided outside of the reactor shield 25. Radiation emitted from the fuel element is then fed, in the manner described above, to the semi-conductor-detector 3 and from there measured further (not shown) such, as set forth above. In FIG. 9 the cooling of the semi-conductor-detector 3 is illustrated by immersing a copper rod 29 into a vessel 30 containing liquid air. In order to keep free the area covering the measuring device in the vicinity of the fuel elements 22 from disturbances, gas and air, respectively, is blown into the space 27. In the present instance the blowing takes place from an air tank 31 and the fuel element 22 is surrounded by water. In order to avoid disturbances as much as possible, the distance 28 between the fuel element 22 and the first collimator part 23 is kept small. The essential constructive parts of this measuring device are adjustable and may be secured in position to comply with all possible conditions.

Figure 10:
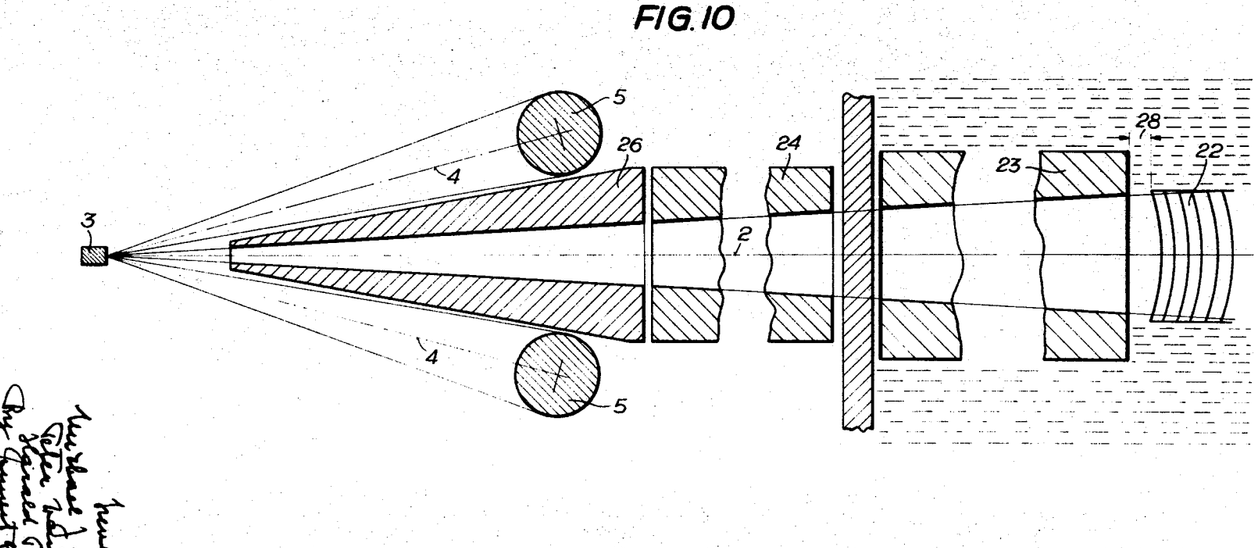
FIG. 10 is a fragmentary view of a portion of the device shown in FIG. 9 at an enlarged scale.

Referring now again to the drawings, and more particularly to FIG. 10, the device for the performance of the measuring in accordance with the present invention is shown wherein the same parts as decribed heretofore have the same numerals, so that a repeated explanation of the individual parts is not required.

The present invention is not limited to the embodiments disclosed by example in the specification. Basically, the concept of the present invention resides in the use of a semi-conductor-detector where an incoming radiation, particularly γ-radiation, is to be analyzed concerning its energy composition. The measuring can be based thereby not only on the Compton-effect, but also on the pair-formation effect. In the spectrometer the energy composition is determined, and in the polarimeter primarily the polarization of the γ-rays. Basically, all possible angles of incoming and reflecting radiation are considered, whereby different sensitivities are functions of these angles. In particular, emphasis is made to the fact that the technical application of the present invention is primarily in the area of the destruction-fire burn-up measuring of nuclear core fuels. In this case, the very complicated spectrum is present and the suitable cesium 137, γ-line can be measured at the present time in this spectrum only.

While we have disclosed several embodiments of the present invention, it is to be understood that this embodiment is given by example only and not in a limiting sense, the scope of the present invention being determined by the objects and the claims.

We claim:

1. A method of measuring the physical characteristics of gamma rays for measurements of nuclear reactor core fuel, comprising the steps of
    feeding primary X-ray radiation to a semi-conductor detector in which said X-ray radiation undergoes a scattering interaction producing secondary radiation, the latter of which is detected, and producing a first signal proportional to the energy of said secondary radiation,
    sending said first signal to a coincidence circuit,
    detecting the scattered primary X-ray radiation in at least one selectively positioned second detector and producing a second signal as a result thereof,
    sending said second signal to said coincidence circuit and permitting said first signal to pass to a measuring device when said first and second signals are sent substantially simultaneously to said coincidence circuit, and
    measuring and classifying said first signals in said measuring device and counting predetermined first signals, thereby providing a measure of the intensity of predetermined primary X-rays.

2. The method, as set forth in claim 1, further comprising the step of
    introducing said primary X-ray radiation close to the positive electrode of said semi-conductor detector.

3. The method, as set forth in claim 1, particularly for determining of the burn-up condition of the nuclear reactor core fuel, wherein
    said predetermined primary X-rays are gamma rays from fission products having a relatively long half-life relative to the period since reactor operation, and
    said predetermined first signals are those signals occurring from secondary radiation caused by said predetermined primary X-rays when said predetermined primary X-rays scatter into the direction so as to be received in said second detector.

4. The method, as set forth in claim 3, further for determining other performance characteristics of the nuclear reactor core fuels, wherein
    at least some of said predetermined primary X-rays are gamma rays from fission products having relatively short half-lives.

5. An apparatus for measuring the physical characteristics of gamma rays for measurements of nuclear reactor core fuel, comprising
    a collimator for directing a narrow beam of primary X-ray radiation,
    a semi-conductor detector means disposed in the path of said narrow beam of primary X-ray radiation and for scattering said primary X-ray radiation therein, thereby producing secondary radiation therein and for detecting said secondary radiation and for producing a first signal proportional to the energy of said secondary radiation,
    at least one second detector means positioned spaced from said semi-conductor detector means at a predetermined angle therefrom relative to the direction of said narrow beam of primary X-ray radiation for receiving scattered primary X-ray radiation which is scattered into said second detector means and for providing a second signal thereupon,
    coincidence circuit means connected to said semi-conductor detector means and to said second detector means for receiving said first and second signals, respectively, and for passing an output signal when said first and second signals are substantially simultaneously received thereat, and
    a measuring device for measuring and classifying said output signal.

6. The apparatus, as set forth in claim 5, wherein said second detector includes semi-conductor elements.

7. The apparatus, as set forth in claim 5, wherein said predetermined angle is approximately 180°.

8. The apparatus, as set forth in claim 5, particularly for the measuring of the linear polarization of said primary X-ray radiation, wherein
said predetermined angle is approximately 90°.

9. The apparatus, as set forth in claim 5, wherein said collimator comprises,
a first collimator portion defining a first opening disposed adjacent to and directly in front of said nuclear reactor core fuel within the nuclear reactor,
a second collimator portion defining a second opening disposed longitudinally adjacent to said first collimator portion and disposed within the shielding of said nuclear reactor, and
a third collimator portion defining a third opening disposed longitudinally adjacent said second collimator portion outside of said shielding.

10. The apparatus, as set forth in claim 9, further comprising
a gas filled evacuated container disposed in said nuclear reactor adjacent said nuclear reactor core fuel and opposite said first opening of said first collimator portion.

References Cited

Semat, H., Introduction to Atomic and Nuclear Physics, 4th edition, 1962, pp. 180–186.

RALPH G. NILSON, Primary Examiner

M. J. FROME, Assistant Examiner

U.S. Cl. X.R.

250—51.5, 83.1, 105